(12) United States Patent
Masuda

(10) Patent No.: US 10,125,834 B2
(45) Date of Patent: Nov. 13, 2018

(54) ELECTRIC BRAKE DEVICE AND ELECTRIC BRAKE DEVICE SYSTEM

(71) Applicant: NTN CORPORATION, Osaka-shi, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/265,271

(22) Filed: Sep. 14, 2016

(65) Prior Publication Data

US 2017/0002881 A1   Jan. 5, 2017

Related U.S. Application Data

(63) Continuation of application No. PCT/JP2015/057770, filed on Mar. 16, 2015.

(30) Foreign Application Priority Data

Mar. 24, 2014   (JP) ................. 2014-059503

(51) Int. Cl.
*B60T 8/00* (2006.01)
*F16D 65/18* (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC ...... F16D 65/18; F16D 66/021; F16D 55/226; F16D 2121/24; F16D 13/741;
(Continued)

(56) References Cited

U.S. PATENT DOCUMENTS 6,464,308 B2 * 10/2002 Kubota ................. B60T 13/741
188/1.11 E
7,445,091 B2   11/2008 Kawahara et al.
(Continued)

FOREIGN PATENT DOCUMENTS

CN       102207145 A    10/2011
CN       102619910 A     8/2012
(Continued)

OTHER PUBLICATIONS

International Preliminary Report on Patentability dated Oct. 6, 2016 in corresponding International Patent Application No. PCT/JP2015/057770.
(Continued)

*Primary Examiner* — Pamela Rodriguez

(57) ABSTRACT

The electric brake device includes an electric motor, a friction pad, a linear motion mechanism, a braking force command section, a braking force estimation section, and a controller. The controller is provided with a pad wear amount estimation section to estimate a wear amount of the friction pad and a motor rotation angle detector to detect a motor rotation angle. The pad wear amount estimation section estimates a wear amount of the friction pad from the rotation angle of the electric motor, obtained by the motor rotation angle detector, which rotation angle corresponds to a distance between a retraction end at which a linear motion portion of the linear motion mechanism is separated from a brake rotor and an advance end at which the linear motion portion approaching the brake rotor generates the braking force.

6 Claims, 6 Drawing Sheets

(51) Int. Cl.
*B60T 13/74* (2006.01)
*F16D 55/226* (2006.01)
*F16D 66/02* (2006.01)
*F16D 121/24* (2012.01)
*F16D 125/40* (2012.01)

(52) U.S. Cl.
CPC ........ *F16D 66/021* (2013.01); *F16D 2121/24* (2013.01); *F16D 2125/40* (2013.01)

(58) Field of Classification Search
CPC ............. F16D 65/567; F16D 2066/005; F16D 2066/003; F16D 2125/36; F16D 2066/006; F16D 2125/30; F16D 2125/40; B60T 17/221; B60T 13/741
USPC .......... 303/20, 3; 188/71.8, 71.9, 72.1, 72.8, 188/156, 158, 162
See application file for complete search history.

(56) References Cited

U.S. PATENT DOCUMENTS

| | | | |
|---|---|---|---|
| 8,676,409 B2 | 3/2014 | Takeda et al. | |
| 8,833,526 B2 | 9/2014 | Goto et al. | |
| 9,217,479 B2 | 12/2015 | Masuda et al. | |
| 9,501,063 B2* | 11/2016 | Masuda | F16D 65/18 |
| 2002/0027387 A1 | 3/2002 | Kubota | |
| 2008/0029355 A1 | 2/2008 | Kawahara et al. | |
| 2008/0059023 A1* | 3/2008 | Ueno | B60T 1/10 |
| | | | 701/36 |
| 2009/0032342 A1* | 2/2009 | Yamaguchi | B60T 13/741 |
| | | | 188/72.3 |
| 2011/0246039 A1* | 10/2011 | Takeda | B60T 13/741 |
| | | | 701/70 |
| 2012/0193177 A1 | 8/2012 | Goto et al. | |
| 2013/0327601 A1 | 12/2013 | Masuda et al. | |

FOREIGN PATENT DOCUMENTS

| | | |
|---|---|---|
| CN | 103314234 A | 9/2013 |
| EP | 2 662 587 | 11/2013 |
| GB | 2029528 | 3/1980 |
| JP | 59-40028 | 3/1984 |
| JP | 61-127931 | 6/1986 |
| JP | 61-46689 | 10/1986 |
| JP | 6-327190 | 11/1994 |
| JP | 2002-205634 | 7/2002 |
| JP | 2002-213507 | 7/2002 |
| JP | 2003-14018 | 1/2003 |
| JP | 2010-6165 | 1/2010 |
| JP | 4463812 | 2/2010 |
| JP | 4756230 | 6/2011 |
| JP | 2012-159134 | 8/2012 |

OTHER PUBLICATIONS

International Search Report dated Jun. 16, 2015 in corresponding International Application No. PCT/JP2015/057770.
Extended and Supplementary European Search Report dated Nov. 8, 2017 in corresponding European Patent Application No. 15770246.5, 7 pages.
Japanese Office Action issued Nov. 28, 2017 in corresponding Japanese Patent Application No. 2014-059503, 3 pages.
Office Action dated Apr. 3, 2018, in corresponding Chinese Patent Application No. 201580015698.7, 7 pgs.

* cited by examiner

ELECTRIC BRAKE DEVICE AND ELECTRIC BRAKE DEVICE SYSTEM

CROSS REFERENCE TO THE RELATED APPLICATION

This application is a continuation application, under 35 U.S.C. § 111(a), of international application No. PCT/JP2015/057770, filed Mar. 16, 2015, which is based on and claims Convention priority to Japanese patent application No. 2014-059503, filed Mar. 24, 2014, the entire disclosure of which is herein incorporated by reference as a part of this application.

BACKGROUND OF THE INVENTION

Field of the Invention

The present invention relates to an electric brake device and an electric brake device system that can detect the progression of wear of a friction pad at all times to prevent the friction pad from reaching its wear limit, thereby allowing a maintenance work or the like to be performed at an appropriate time.

Description of Related Art

As conventional methods for controlling an electric brake, the following techniques have been proposed.

(1) An electric brake device using a motor and a linear motion mechanism (Patent Document 1).

(2) A method in which the wear limit is detected by using a contact terminal embedded in a brake pad (Patent Document 2).

(3) A method in which the pad wear limit is detected based on vibrations of a projection provided at the same position as the pad wear limit position (Patent Document 3).

(4) A method in which the pad wear amount is estimated from relative positions of slide pins and a caliper during braking (Patent Document 4).

(5) A system in which a brake pad pressing force detection unit is formed in a linear motion mechanism that presses a friction pad against a brake disc, and the brake pad pressing force detection unit is constituted of a piezo element (Patent Document 5).

RELATED DOCUMENT

Patent Document

[Patent Document 1] JP Laid-open Patent Publication No. H06-327190

[Patent Document 2] JP Laid-open Patent Publication No. S61-127931

[Patent Document 3] JP Laid-open Patent Publication No. S59-040028

[Patent Document 4] JP Examined Patent Publication No. S61-046689

[Patent Document 5] JP Laid-open Patent Publication No. 2003-014018

With the method (2) in which the wear limit is detected by using the contact terminal or the method (3) in which the pad wear limit is detected based on the vibrations of the projection, the pad wear is found only after the pad wear limit is reached. Therefore, the pad wear may progress beyond its limit in a situation where a maintenance work cannot be performed immediately. In addition, with such a method in which the pad is brought into direct contact with a brake rotor, the exhaustion of the brake rotor may be promoted at the time when the pad wear limit is reached because the pad wear is found only after the pad wear limit is reached.

With the method (4) in which the pad wear amount is estimated from relative positions of slide pins and a caliper, a dedicated sensor is required, which may lead to increase in cost, and the area surrounding a brake cylinder, including the slide pin portion, is subjected to severe thermal and vibration conditions. Also with the method (5), the linear motion mechanism is subjected to severe thermal and vibration conditions. Therefore, in the case where a sensor or the like is mounted, it is difficult to achieve desired durability and reliability, and the cost and the space may be further increased from the viewpoint of protecting the sensor.

SUMMARY OF THE INVENTION

An object of the present invention is to provide an electric brake device and an electric brake device system that can prevent pad wear from progressing beyond its limit, and also can estimate the wear of a friction pad without increase in cost and space.

Hereinafter, in order to facilitate the understanding, the present invention will be described with reference to the reference numerals used in embodiments for convenience sake.

An electric brake device according to the present invention includes: an electric motor 2; a brake rotor 5; a friction pad 6 configured to come into contact with the brake rotor 5 to generate a braking force; a linear motion mechanism 4 configured to convert a rotary motion of the electric motor 2 into a linear motion of the friction pad 6; a braking force command section 26a configured to generate a command value of a target braking force by using an operation amount of a brake operation portion 29; a braking force estimation section 30 configured to obtain an estimated value of a braking force that presses the friction pad 6 against the brake rotor 5; a motor rotation angle detector 28 configured to detect a rotation angle of the electric motor 2; and a controller 7 configured to control the electric motor 2 according to the command value and the estimated value of the braking force, wherein the controller 7 is provided with a pad wear amount estimation section 37 configured to estimate a wear amount of the friction pad 6.

The pad wear amount estimation section 37 estimates the wear amount of the friction pad 6 from the rotation angle of the electric motor 2, obtained by the motor rotation angle detector 28, which rotation angle corresponds to a distance between a retraction end at which a linear motion portion 14 of the linear motion mechanism 4 is separated or moved away from the brake rotor 5 and an advance end at which the linear motion portion 14 approaching the brake rotor 5 generates the braking force.

The braking force estimation section 30 may be a section to detect a braking force using a sensor.

According to this configuration, for example, when a vehicle including the electric brake device is continuously stopped, the controller 7 causes the pad wear amount estimation section 37 to estimate the wear amount of the friction pad 6 through an operation of the brake operation portion 29. The brake operation portion 29 may be operated by either the controller 7 or a driver.

The pad wear amount estimation section 37 estimates the wear amount of the friction pad 6 from the rotation angle of the electric motor 2, obtained by the motor rotation angle detector 28, which rotation angle corresponds to a distance between the retraction end and the advance end of the linear motion portion 14 in the linear motion mechanism 4. The retraction end is a retraction limit position at which the linear motion portion 14 is most separated from the brake motor 5. For example, the retraction end can be obtained from a voltage and a rotational speed or number of rotation of the electric motor 2 per unit time if the physical characteristics such as an inductance and a resistance value of a motor coil, and rotor inertia are known in advance. The advance end is a position at which the linear motion portion 14 approaching the brake rotor 5 generates the braking force, that is, a position of the linear motion portion 14 where the friction pad 6 comes into contact with the brake rotor 5 to generate the braking force.

The pad wear amount estimation section 37 can estimate the wear amount of the friction pad 6, by using motor rotation angles, from the retraction end to the point where the friction pad 6 comes into contact with the brake rotor 5. In this case, when the friction pad 6 is worn, the friction pad 6 does not come into contact with the brake rotor 5 unless the moving distance of the friction pad 6 is increased by the wear amount. Thus, a motor rotation angle varies depending on the wear amount. Accordingly, the wear amount of the friction pad 6 can be estimated from variations in motor rotation angle. However, to compare motor rotation angles mentioned above, the reference position of the motor rotation angle needs to be defined accurately.

Regarding this, since the retraction limit position at which the linear motion portion 14 is most separated from the brake rotor 5 is used as a reference, the reference position of a motor rotation angle can be accurately set irrespective of whether the friction pad 6 is worn. Accordingly, the wear amount of the friction pad 6 can be accurately estimated. This enables the progression of wear of the friction pad 6 to be detected at all times, thereby preventing the wear of the friction pad 6 from progressing beyond its wear limit. By predicting, to a certain degree, the timing at which the friction pad 6 reaches its wear limit, a maintenance work for the electric brake device can be performed at an appropriate time before the timing at which the wear limit is reached.

A dedicated sensor for detecting the wear amount of the friction pad 6 is not required, and the motor rotation angle detector 28 which is basically required for electric brake devices is used to detect respective motor rotation angles at the retraction end and the advance end of the linear motion portion 14. This enables the wear of the friction pad 6 to be estimated without involving as great increase in cost and space as the method (4) in which the pad wear amount is estimated from relative positions of the slide pins and the caliper.

A housing 1 configured to hold the electric motor 2 and the linear motion mechanism 4 may be provided, the linear motion mechanism 4 may include a rotation shaft 9 configured to be rotationally driven by the electric motor 2, a conversion mechanism section 10 configured to convert a rotary motion of the rotation shaft 9 into a linear motion of the linear motion portion 14, and restraining sections 11 and 12 configured to generate a restraining force for restraining the axial position of the rotation shaft 9 with respect to the housing 1, and the restraining section 12 may generate the restraining force for the rotation shaft 9 with respect to the housing 1 when the linear motion portion 14 reaches the retraction end.

In this case, the rotation shaft 9 is rotationally driven in one direction by the electric motor 2. This causes the conversion mechanism section 10 to convert the rotary motion of the rotation shaft 9 into the linear motion of the linear motion portion 14 in one given direction, thereby moving the linear motion portion 14 in a direction of separation from the brake rotor 5. When the linear motion portion 14 reaches the retraction end, the restraining section 12 generates the restraining force for the rotation shaft 9 with respect to the housing 1. For example, the controller 7 can detect the position of the retraction end of the linear motion portion 14 by using, for example, current detector 34 configured to measure a current of the electric motor 2 to estimate a motor torque and by detecting a occurrence of the restraining force from the motor torque.

The controller 7 may include a relation setting section 39 configured to set the relation between an applied voltage to the electric motor 2 and the rotation angle of the electric motor 2 detected by the motor rotation angle detector 28, and may estimate the restraining force by inquiring of the relation setting section 39 about the applied voltage and the rotation angle. For example, the relation between the applied voltage to the electric motor 2 and the rotation angle of the electric motor 2 detected by the motor rotation angle detector 28 is defined based on results of an experiment, simulation, or the like. For example, the relation setting section 39 is composed of a table or the like, and is recorded in recording portion 51 in a rewritable manner. When the restraining force defined by inquiring of the relation setting section 39 about the applied voltage to the electric motor 2 and the motor rotation angle is obtained, the controller 7 recognizes that the linear motion portion 14 is positioned at the retraction end, and can detect the motor rotation angle at the retraction end.

The controller 7 may include a torque estimation section 38 configured to estimate a torque of the electric motor 2, and may estimate the restraining force from the torque estimated by the torque estimation section 38. In this case, the controller 7 causes the linear motion portion 14 of the linear motion mechanism 4 at a predetermined position to retract in a direction being separated from the brake rotor 5. When the linear motion portion 14 comes, at the retraction position, into contact with a fixed portion in the housing 1, the motor rotation speed decreases and the motor torque increases in the negative direction. That is, the absolute value of the motor torque increases. The controller 7 uses, as a reference position, the position at which the motor torque increases to cause the linear motion portion 14 to advance toward the brake rotor 5 from the reference position, and detects the motor rotation angle until the friction pad 6 comes into contact with the brake rotor 5.

The braking force estimation section 30 may include a load sensor 13 configured to detect an axial load of the linear motion mechanism 4. In this case, when the controller 7 causes the linear motion portion 14 to advance from the retraction end, a value detected by the load sensor 13 gradually increases. The value detected by the load sensor 13 becomes maximum at a position where the friction pad 6 comes into contact with the brake rotor 5. By using the load sensor 13 in this way, it is possible to accurately detect the contact position of the friction pad 6.

In an electric brake device system of the present invention, a plurality of any of the above-described electric brake devices A1 are provided in a vehicle, and when the vehicle is stopped by a parking brake for a predetermined time or longer, the controller 7 enables some of the electric brake devices A1 to perform normal brake operations, and causes the pad wear amount estimation section 37 to estimate a wear amount of the friction pad 6 in the other ones of the electric brake devices A1. The predetermined time may be determined, as appropriate, based on results of an experiment, simulation, or the like.

So long as the vehicle is maintained in a stoppage state, wear amounts of the friction pads 6 in the electric brake devices A1 provided in the vehicle are favorably estimated because driving is not disturbed. Thus, when the vehicle is stopped by the parking brake for the predetermined time or longer, for example, the controller 7 maintains the braked state of the vehicle by causing some of the electric brake devices A1 to perform normal brake operations, and causes the pad wear amount estimation section 37 to estimate the wear amount of the friction pad 6 in the other electric brake devices A1. For example, after estimation of the wear amount of the friction pad 6 in the other ones of the electric brake devices A1, the controller 7 maintains the braked state of the vehicle by causing the other ones of the electric brake device A1 to perform normal brake operations, and causes the pad wear amount estimation section 37 to estimate the wear amount of the friction pad 6 in the some of the electric brake devices A1.

In another electric brake device system of the present invention, a plurality of any of the above-described electric brake devices A1 are provided in a vehicle, and the vehicle has as least one of the electric brake devices A1 in respective four quadrants which are regions, defined, on a plane orthogonal to a gravity applied to the vehicle, by being divided into four around a center of gravity P1. When none of the electric brake devices A1 are operated for a predetermined time or longer, the controller 7 enables the electric brake devices A1 in given ones of the quadrants, of the four quadrants, that are diagonal to each other with respect to the center of gravity P1 to perform normal brake operations, and causes the pad wear amount estimation section 37 to estimate a wear amount of the friction pad 6 in other ones of the electric brake devices A1.

In a case where a normal braking operation is performed, when the wear amount of the friction pad 6 is being estimated during travelling of the vehicle and a normal brake operation is performed, the controller 7 operates the electric brake devices A1 in the quadrants that are diagonal to each other. This can suppress occurrence of undesired yaw moment to the vehicle, and can suppress that any behaviors work on the vehicle. The controller 7 may be provided with a warning signal output section 33 configured to output a warning signal to a higher-order control unit of the controller 7 when the wear amount of the friction pad 6 estimated by the pad wear amount estimation section 37 is equal to or greater than a threshold. A driver of the vehicle can recognize that the friction pad 6 almost reaches its wear limit by a warning display, a warning sound, or the like that is outputted from the higher-order control unit. Therefore, at an appropriate time before the timing at which the wear limit is reached, a maintenance work can be performed on the electric brake device having the friction pad 6 that almost reaches the wear limit.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
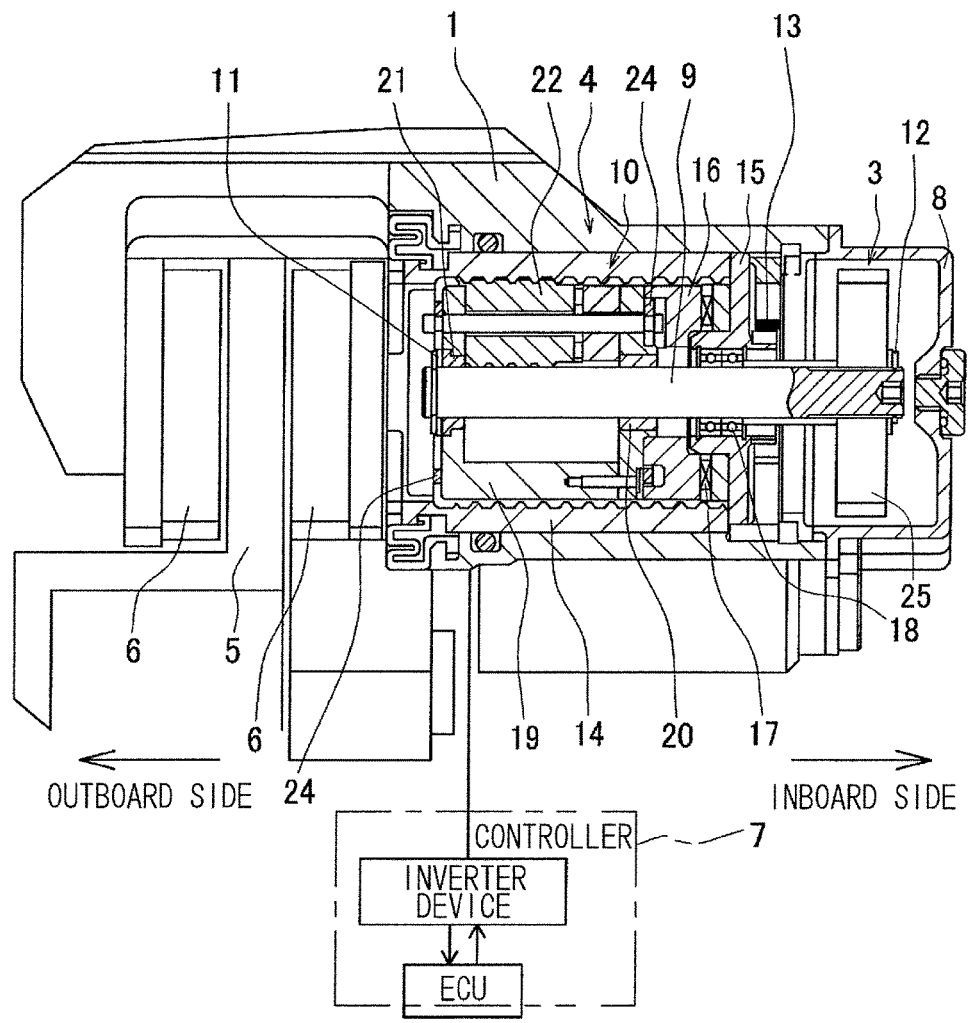
FIG. 1 is a cross-sectional view of a relevant portion of an electric brake device according to an embodiment of the present invention.

An electric brake device according to an embodiment of the present invention will be described with reference to FIGS. 1 to 5B. As shown in FIG. 1, the electric brake device includes a housing 1, an electric motor 2 (FIG. 2), a speed reduction mechanism 3 that reduces the speed of rotation of the electric motor, a linear motion mechanism 4, a brake rotor 5, a friction pad 6, a locking mechanism (not shown), and a controller 7 that controls the electric motor. The electric motor 2 is supported by the housing 1. The linear motion mechanism 4 is incorporated into the housing 1 so as to apply a braking force to the brake rotor 5 (a disc rotor in this example) by an output from the electric motor 2. The housing 1 has an opening end covered by a cover 8.

The linear motion mechanism 4 will now be described. The linear motion mechanism 4 is a mechanism that converts a rotary motion outputted from the speed reduction mechanism 3 into a linear motion and brings the friction pad 6 into contact with the brake rotor 5 or separates the friction pad 6 from the brake rotor 5. The linear motion mechanism 4 includes a rotation shaft 9 that is rotationally driven by the electric motor 2, a conversion mechanism section 10 that converts a rotary motion of the rotation shaft 9 into a linear motion, restraining sections, and a load sensor 13, which is also called a load cell or a force sensor. The conversion mechanism section 10 includes a linear motion portion 14, a bearing member 15, an annular thrust plate 16, a thrust bearing 17, rolling bearings 18, a carrier 19, slide bearings 20 and 21, and a plurality of planetary rollers 22. In the present embodiment, the restraining sections are composed of two restraining sections 11 and 12.

The linear motion portion 14 of a cylindrical shape is supported on the inner circumferential surface of the housing 1 such that the linear motion portion 14 is prevented from rotating and is movable in the axial direction. On the inner circumferential surface of the linear motion portion 14, helical projections are helically formed so as to project by a predetermined distance in the radially inward direction. The plurality of planetary rollers 22 mesh with the helical projection.

The bearing member 15 is provided at one end side, in the axial direction, of the linear motion portion 14 in the housing 1. The bearing member 15 includes a flange portion that extends radially outward, and a boss portion. The plurality of rolling bearings 18 are fitted within the boss portion, and the rotation shaft 9 is fitted onto the inner diameter surface of an inner ring of each of the rolling bearings 18. The rotation shaft 9 is rotatably supported by the bearing member 15 through the plurality of rolling bearings 18. The carrier 19 is provided on the inner circumference of the linear motion portion 14 so as to be rotatable relative to the rotation shaft 9. The carrier 19 has disks that confront each other in the axial direction. The disk proximate to the bearing member 15 may be referred to as an inner disk, and the other disk may be referred to as an outer disk. The outer disk is provided with a distance adjustment member on a side surface facing to the inner disk such that the distance adjustment member projects in the axial direction from the outer circumferential edge portion of the side surface. In order to adjust the distances between the plurality of planetary rollers 22, a plurality of the distance adjustment members are arranged so as to be spaced equidistantly from each other in the circumferential direction. The two disks are integrated with each other with the distance adjustment members.

The inner disk is supported by the slide bearing 20 fitted between the inner disk and the rotation shaft 9 so as to be rotatable and movable in the axial direction. The outer disk has a shaft insertion hole formed at the center thereof and the slide bearing 21 is fitted in the shaft insertion hole. The outer disk is supported by the slide bearing 21 so as to be rotatable relative to the rotation shaft 9. The restraining sections 11 and 12 that receive a thrust load and restrain the axial position of the rotation shaft 9 are provided on both end portions of the rotation shaft 9. Each of the restraining sections 11 and 12 includes, for example, a stopper composed of a washer or the like. Retaining rings for preventing the restraining sections 11 and 12 from being removed are provided on both end portions of the rotation shaft 9.

The carrier 19 has a plurality of roller shafts 23 spaced from each other in the circumferential direction. Opposite end portions of each roller shaft 23 are supported by the inner disk and the outer disk. That is, each of the two disks has a plurality of shaft insertion holes that are formed as oblong holes, and both end portions of each roller shaft 23 are inserted into the corresponding shaft insertion holes, whereby the roller shafts 23 are supported so as to be movable in the radial direction within the ranges of the length of the respective shaft insertion holes. Two elastic rings 24 are extended over the plurality of roller shafts 23 at the both end portions thereof respectively so as to urge a set of the roller shafts 23 in the radially inward direction.

The planetary rollers 22 are rotatably supported by the corresponding roller shafts 23, and each planetary roller 22 is disposed between the outer circumferential surface of the rotation shaft 9 and the inner circumferential surface of the linear motion portion 14. Each planetary roller 22 is pressed against the outer circumferential surface of the rotation shaft 9 by the urging force of the elastic ring 24 extended over around the plurality of roller shafts 23. By a rotation of the rotation shaft 9, each planetary roller 22 that is in contact with the outer circumferential surface of the rotation shaft 9 rotates due to a contact friction therebetween. On the outer circumferential surface of each planetary roller 22, a helical groove is formed so as to mesh with the helical projection of the linear motion portion 14.

The speed reduction mechanism 3 is a mechanism that reduces the speed of rotation of the electric motor 2 and transmits the rotation thereof to an output gear 25 fixed to the rotation shaft 9. The speed reduction mechanism 3 includes a plurality of gear trains (not shown). In this example, the speed reduction mechanism 3 sequentially reduces, by the above-described gear trains, the speed of rotation of an input gear (not shown) mounted to a rotor shaft (not shown) of the electric motor 2, and allows the rotation to be transmitted to the output gear 25. The locking mechanism is configured to be able to switch between; a locking state in which a braking force reducing operation of the linear motion mechanism 4 is inhibited; and an unlocking state in which the braking force reducing operation is permitted.

Figure 2:
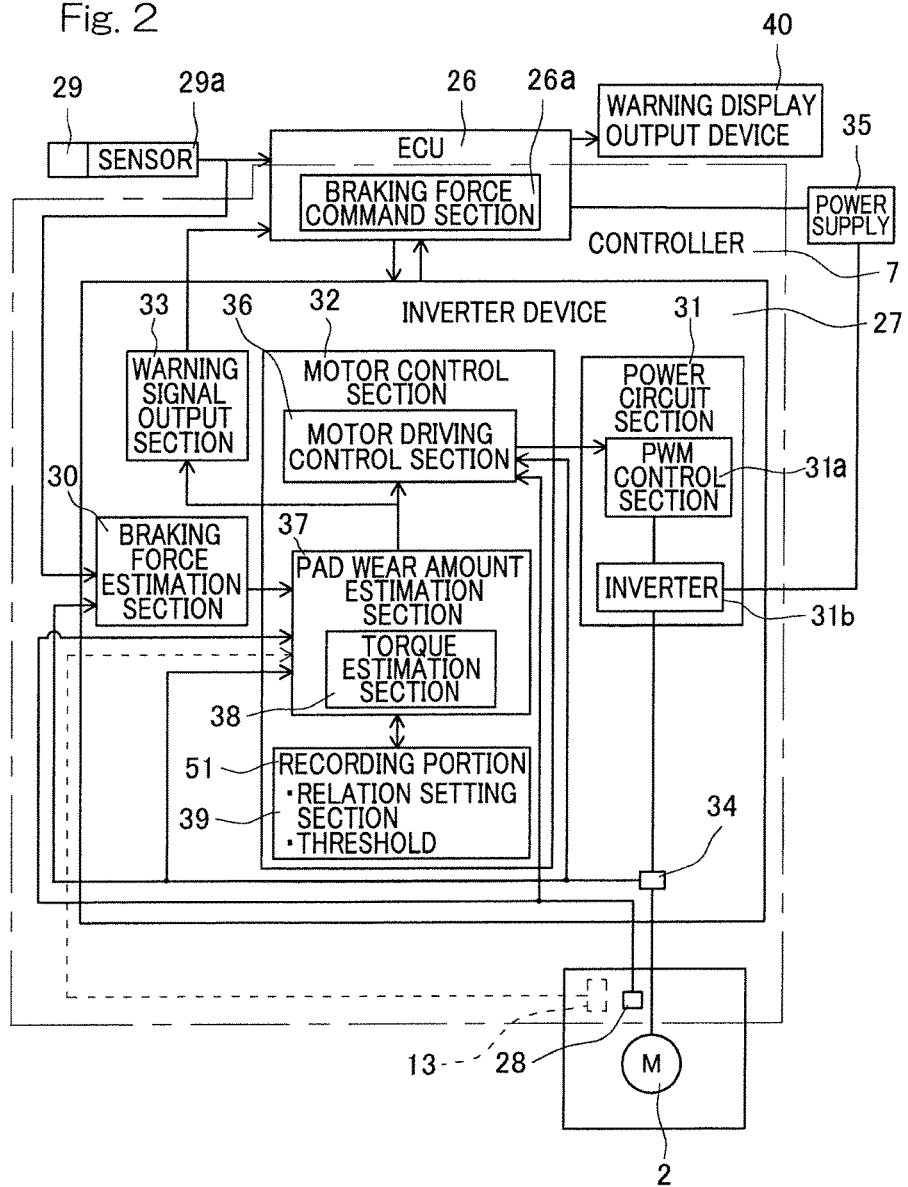
FIG. 2 is a block diagram of a control system of the electric brake device.

FIG. 2 is a block diagram of a control system of the electric brake device. The controller 7 of the electric brake device includes a braking force command section 26a provided in an ECU 26, an inverter device 27, and a motor rotation angle detector 28 which is a rotation angle sensor or a rotary encoder, for example. As the ECU 26 serving as a higher-order control unit of the inverter device 27, an electric control unit that performs overall control of a vehicle is applied, for example. In response to an output from a sensor 29a that varies according to the operation amount of a brake pedal serving as a brake operation portion 29, the braking force command section 26a generates a command value of a target braking force by using an LUT (Look Up Table) or a predetermined transform function or the like from a library and outputs the command value. The brake operation portion 29 is not limited to a pedal input device, and may be a button input device, a lever input device or the like so long as it is used by the operator to provide an instruction to apply a brake.

The inverter device 27 includes: a braking force estimation section 30 that obtains an estimated value of the braking force that presses the friction pad 6 (FIG. 1) against the brake rotor 5 (FIG. 1); a power circuit section 31 provided for each electric motor 2; a motor control section 32 that controls the corresponding power circuit section 31; a warning signal output section 33, which will be described later; and a current detector 34.

The braking force estimation section 30 determines, from an output from a sensor 29a that varies according to the operation amount of the brake operation portion 29 and from a motor current detected by the current detector 34, an appropriate estimated value of the braking force by calculation using an LUT or a predetermined transform function or the like from a library. The relationship among the output of the sensor 29a, the motor current, and the estimated value of the braking force is defined in advance based on results of an experiment, simulation, or the like, and is recorded in a recording portion 51 in a rewritable manner.

In addition to this, the braking force estimation section 30 may include, in the housing 1 of the linear motion mechanism 4 illustrated in FIG. 1, the load sensor 13 that detects an axial load of the linear motion mechanism 4. In this case, when the controller 7 causes the linear motion portion 14 to advance from a retraction end, which will be described later, a value detected by the load sensor 13 gradually increases. The value detected by the load sensor 13 becomes maximum at a position where the friction pad 6 comes into contact with the brake rotor 5. By using the load sensor 13 in this way, it is possible to accurately detect the contact position of the friction pad 6.

As illustrated in FIG. 2, the motor control section 32 is composed of a computer including a processor, and electronic circuits such as a ROM (Read Only Memory) including a program to be executed by the processor, a RAM (Random Access Memory), and a co-processor. According to a command value of the braking force provided by the braking force command section 26*a* and an estimated value of the braking force estimated by the braking force estimation section 30, the motor control section 32 converts these values into a current command represented by a voltage value, and provides the current command to the power circuit section 31. The motor control section 32 has a function for outputting, to the ECU 26, various types of information such as detected values and control values for the electric motor 2. The power circuit section 31 includes: an inverter 31*b* that converts DC power from a power supply 35 to three-phase AC power that is to be used for driving the electric motor 2; and a PWM control section 31*a* that controls the inverter 31*b*. The electric motor 2 is composed of a three-phase synchronous motor or the like. The inverter 31*b* includes a plurality of semiconductor switching elements (not shown), and the PWM control section 31 a performs pulse width modulation of the inputted current command and provides an on/off command to each of the semiconductor switching elements.

The motor control section 32 includes a motor driving control section 36 as a basic control section thereof. According to the above-described command value and estimated value of the braking force, the motor driving control section 36 converts these values into a current command represented by a voltage value, and provides a motor operation command value including the current command to the PWM control section 31*a* of the power circuit section 31. The motor driving control section 36 obtains, from the current detector 34, a motor current supplied from the inverter 31*b* to the electric motor 2 and performs a current feedback control for the command value of the braking force. The motor driving control section 36 obtains a rotation angle of the rotor (not shown) of the electric motor 2 from the motor rotation angle detector 28, and provides a current command to the PWM control section 31*a* such that efficient motor driving corresponding to the rotor rotation angle is enabled.

The motor control section 32 is provided with a pad wear amount estimation section 37 that estimates the wear amount of the friction pad 6 (FIG. 1), recording portion 51, and the like. The pad wear amount estimation section 37 estimates the wear amount of the friction pad 6 (FIG. 1), from the rotation angle of the electric motor 2 which rotation angle corresponds to a distance between the retraction end and the advance end of the linear motion portion 14 (FIG. 1) and which is obtained by the motor rotation angle detector 28. The pad wear amount estimation section 37 performs calculation and estimates the wear amount using, for example, an LUT or a predetermined transform function or the like from a library.

Figure 3A:
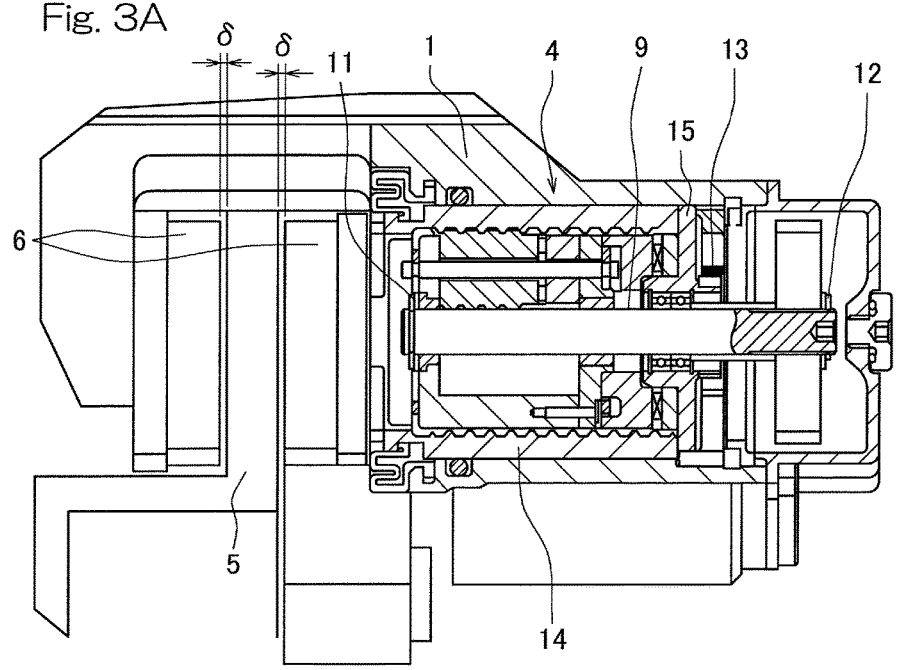
FIG. 3A is a cross-sectional view showing a state where a friction pad of the electric brake device is positioned at a rearmost end.
Figure 3B:
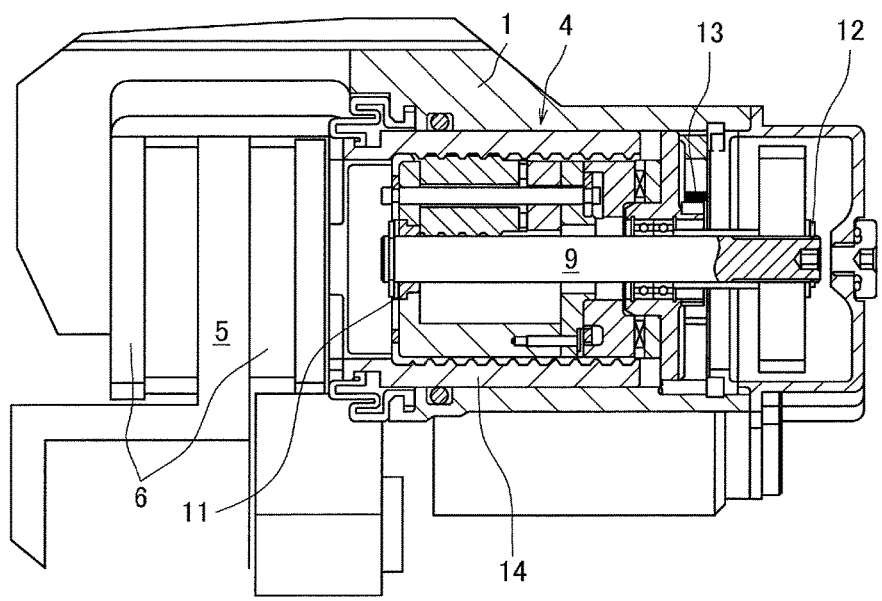
FIG. 3B is a cross-sectional view showing a state where the friction pad in contact with a brake rotor generates a braking force.

FIG. 3A is a cross-sectional view showing a state where the friction pad 6 of the electric brake device is positioned at a rearmost end. FIG. 3B is a cross-sectional view showing a state where the friction pad 6 in contact with the brake rotor 5 generates a braking force. As illustrated in FIG. 3A, the retraction end of the linear motion portion 14 in the linear motion mechanism 4 is a position at which the linear motion portion 14 is most separated from the brake rotor 5 such that the friction pad 6 is positioned at its rearmost end having a specific clearance δ between the friction pad 6 and the brake rotor 5. More specifically, the retraction end of the linear motion portion 14 is a position at which one end, in the axial direction, of the linear motion portion 14 is in contact with an outboard-side (FIG. 1) end surface of the flange portion of the bearing member 15.

When the linear motion portion 14 reaches the retraction end, one restraining section 12 (shown at the right side in the drawing) of the two restraining portions inhibits an operation for projecting the rotation shaft 9. In other words, the restraining section 12 receives a thrust load from the rotation shaft 9 and prevents further projection of the rotation shaft 9 toward the inboard side. In this way, the restraining section 12 generates a restraining force for the rotation shaft 9 with respect to the housing 1. As illustrated in FIG. 2, the pad wear amount estimation section 37 includes torque estimation section 38 that estimates a torque of the electric motor 2, for example. The torque estimation section 38 can estimate a motor torque from a motor current detected by the current detector 34. The torque estimation section 38 calculates and estimates a motor torque by using an LUT or a predetermined transform function or the like from a library.

Figure 4:
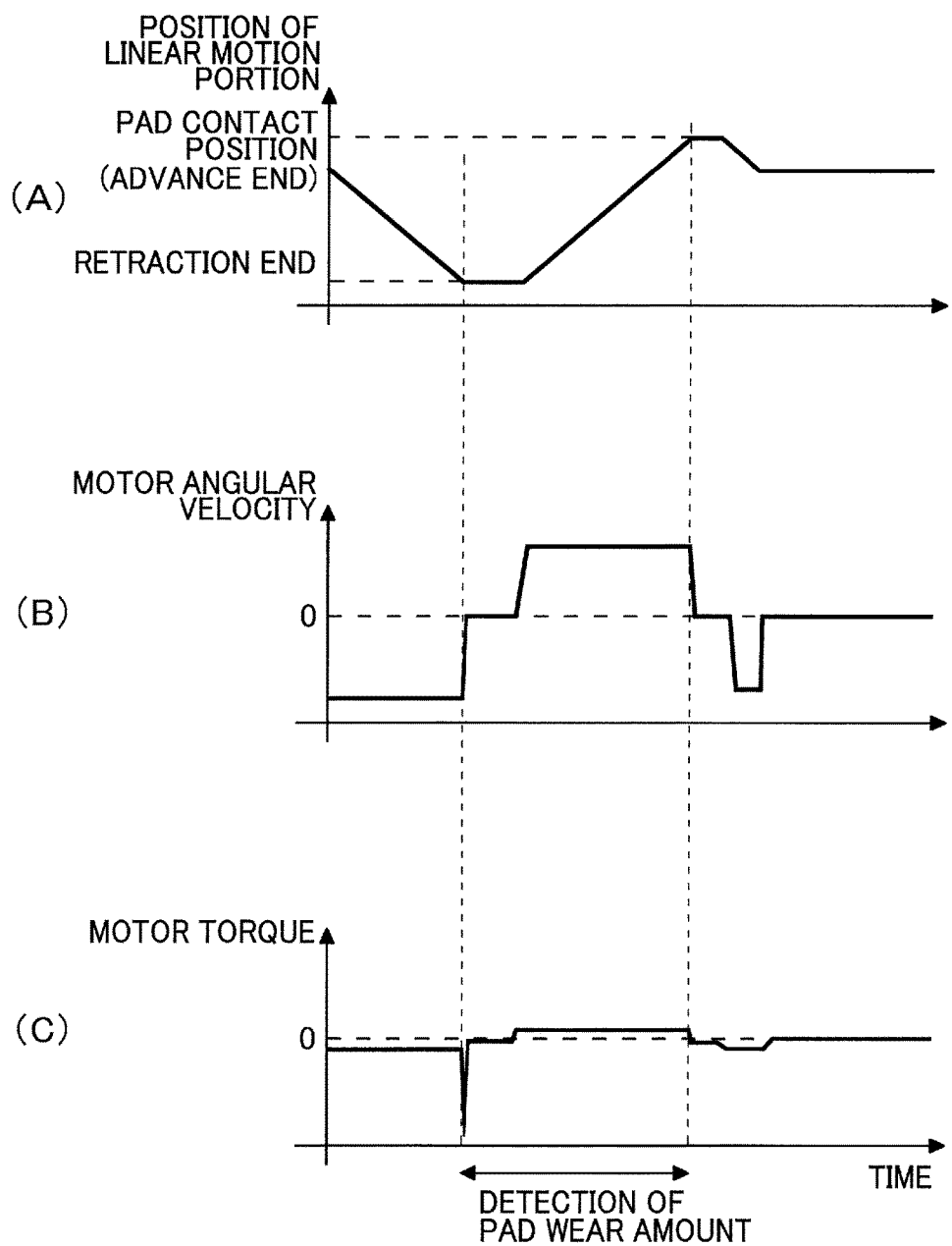
FIG. 4 shows diagrams, in which diagram (A) is an operation conceptual diagram showing change in position of a linear motion portion of the electric brake device, diagram (B) shows a value of a motor rotation angular velocity corresponding to the position of the linear motion portion, and diagram (C) shows a value of a motor torque corresponding to the position of the linear motion portion.

Diagram (A) of FIG. 4 is an operation conceptual diagram showing change in position of the linear motion portion of the electric brake device. Diagram (B) of FIG. 4 shows a value of a motor rotation angular velocity corresponding to the position of the linear motion portion. Diagram (C) of FIG. 4 shows a value of a motor torque corresponding to the position of the linear motion portion. The following description will be given also with appropriate reference to FIGS. 1 and 2.

As shown in diagrams (A) and (C) of FIG. 4, when the linear motion portion 14 of the linear motion mechanism 4 at a predetermined position is caused to retract in a direction being separated from the brake rotor 5 and the linear motion portion 14 comes, at the retraction position, into contact with the flange portion in the housing 1, a restraining force is generated to the rotation shaft 9, thereby reducing the motor rotation speed and increasing the motor torque in the negative direction. That is, the absolute value of the motor torque increases.

The controller 7 sets, based on the motor current detected by the current detector 34, a position at which the absolute value of the motor torque increases as a reference position (at which the motor rotation angle is "0"), causes the linear motion portion 14 to advance toward the brake rotor from the reference position, and detects a motor rotation angle until the friction pad 6 reaches a position (a position without a clearance δ) at which the friction pad 6 comes into contact with the brake rotor 5, that is, the position of the advance end. The position at which the friction pad 6 comes into contact with the brake rotor 5 is obtained from the estimated value of a braking force estimated by the braking force estimation section 30. Subsequently, as shown in diagram (A) of FIG. 4, the controller 7 moves the linear motion portion 14 back to the above-mentioned predetermined position.

As shown in diagrams (A) and (B) of FIG. 4, the controller 7 may include a relation setting section 39 (see FIG. 2) that sets a relation between an applied voltage to the electric motor 2 and the motor rotation angle detected by the motor rotation angle detector 28, instead of the torque estimation section 38, and may estimate the above-described restraining force by inquiring of the relation setting section 39 about the applied voltage and the motor rotation angle. For example, the relation setting section 39 is composed of a predetermined transform function or the like from a library or a table such as an LUT, and is recorded in the recording portion 51 in a rewritable manner.

The pad wear amount estimation section 37 recognizes, from the estimated restraining force, that the linear motion portion 14 has reached the retraction end, and detects a motor rotation angle at the retraction end of the linear motion portion 14. Subsequently, the linear motion portion 14 is caused to advance toward the brake rotor 5. The pad wear amount estimation section 37 detects a motor rotation angle until a position where the friction pad 6 comes into contact with the brake rotor 5, which is illustrated in FIG. 3B. A position at which the friction pad 6 comes into contact with the brake rotor 5 is obtained from an estimated value of a braking force estimated by the braking force estimation section 30. A contact position of the friction pad 6 may be detected, without using the load sensor 13, based on reduction in motor rotation speed due to a reaction force generated when the friction pad 6 presses against the brake rotor 5. As illustrated in FIG. 2, the inverter device 27 is provided with the warning signal output section 33 that outputs a warning signal to the ECU 26. The warning signal output section 33 outputs a warning signal to the ECU 26 when the wear amount of the friction pad 6 which is estimated by the pad wear amount estimation section 37 is equal to or greater than a threshold. The threshold is stored in the recording portion 51 in a rewritable manner. A console panel or the like of the vehicle may be provided with a warning display output device 40 such as a display, a warning lamp, or an audio output device. When a warning signal is inputted from the warning signal output section 33 to the ECU 26, the ECU 26 causes the warning display output device 40 to output a warning display or the like. The outputted warning display or the like allows a driver of the vehicle to recognize that the friction pad 6 almost reaches its wear limit.

Figure 5A:
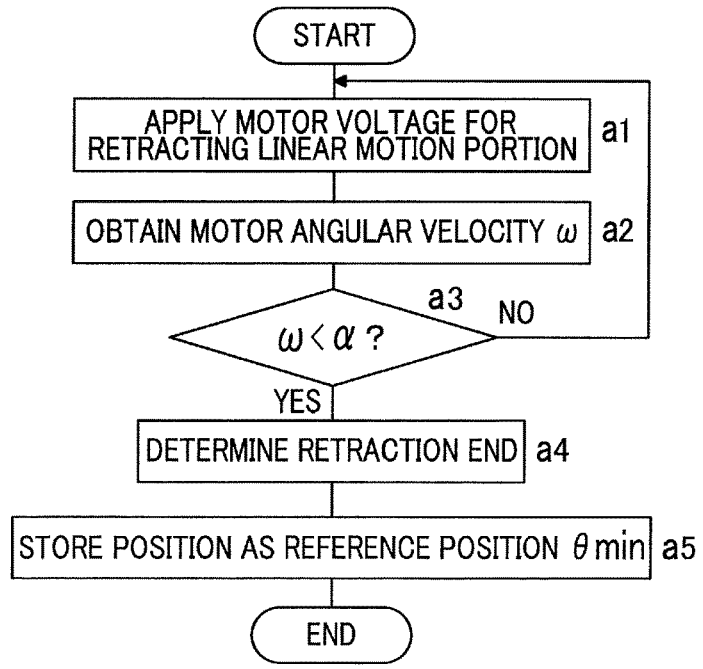
FIG. 5A is a flowchart showing an example of detecting a retraction end of the linear motion portion.
Figure 5B:
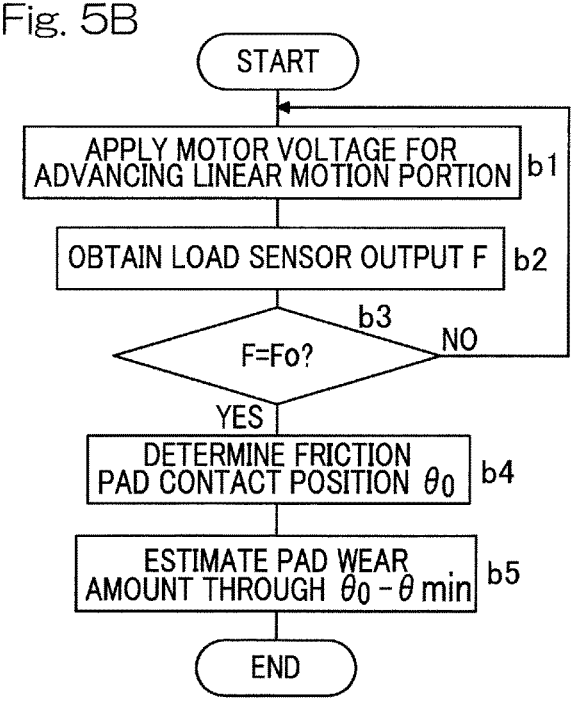
FIG. 5B is a flowchart showing an example of detecting a contact position of the friction pad.

FIG. 5A and FIG. 5B are flowcharts showing an example of detecting a wear amount of the friction pad. FIG. 5A is a flowchart showing an example of detecting the retraction end of the linear motion portion. The controller 7 starts this processing when a vehicle including the electric brake device is at stoppage by, for example, the locking mechanism for a predetermined time or longer. After starting the processing, the controller 7 applies, to the electric motor 2, a motor voltage for retracting the linear motion portion 14 (Step a1). Next, the pad wear amount estimation section 37 of the motor control section 32 obtains a motor angular velocity ω differentiating a motor rotation angle detected by the motor rotation angle detector 28, for example (Step a2).

Next, the pad wear amount estimation section 37 determines whether or not the motor angular velocity ω is less than a threshold α. When it is determined that the motor angular velocity ω is equal to or greater than the threshold α (Step a3: no), the processing returns to Step a1. When it is determined that the motor angular velocity ω is less than the threshold α (Step a3: yes), the pad wear amount estimation section 37 determines that the linear motion portion 14 reaches the retraction end (Step a4). The threshold α can be any value so long as it sufficiently enables determination of reduction in motor rotation speed due to reaching of the linear motion portion 14 to the retraction end, with respect to the motor rotation speed when the linear motion portion 14 retracts. Subsequently, the pad wear amount estimation section 37 stores, in the recording portion 51, a position at which it is determined the linear motion portion 14 has reached the retraction end, as a reference position θmin (Step a5), and the processing ends.

FIG. 5B is a flowchart showing an example of detecting a contact position (advance end) of the friction pad. After the processing in FIG. 5A is performed, the processing shifts to the processing in FIG. 5B. The controller 7 applies a motor voltage for advancing the linear motion portion 14 from the reference position θmin (Step b1). Next, the pad wear amount estimation section 37 obtains an output F from the load sensor 13 (Step b2), and determines whether or not the output F becomes a threshold F0 (Step b3). When the determination results in no (Step b3: no), the processing returns to Step b1. When it is determined that F=F0 is obtained (Step b3: yes), the pad wear amount estimation section 37 determines that the friction pad 6 is at a contact position θ0 (Step b4).

The threshold F0 may be a value extremely close to zero so as to enable sufficient determination of contact of the friction pad 6, or may be a value for generating a certain degree of braking force in order to sufficiently eliminate the influence of the sliding resistance of a slide pin or the like. Subsequently, the pad wear amount estimation section 37 estimates a pad wear amount by subtracting the reference position θmin from the contact position θ0 of the friction pad 6 (θ0−θmin) (Step b5).

According to the electric brake device described above, the pad wear amount estimation section 37 is able to estimate the wear amount of the friction pad 6 from motor rotation angles from the retraction end to the advance end at which the friction pad 6 comes into contact with the brake rotor 5. In this case, when the friction pad 6 is worn, the friction pad 6 does not come into contact with the brake rotor 5 unless the moving distance of the friction pad 6 is increased by the wear amount. Thus, a motor rotation angle varies depending on the wear amount. Accordingly, the wear amount of the friction pad 6 can be estimated from variations in motor rotation angle. However, to compare motor rotation angles, the reference position of the motor rotation angle needs to be determined accurately.

Regarding this, since the retraction limit position (retraction end) at which the linear motion portion 14 is most separated from the brake rotor 5 is used as a reference, the reference position of a motor rotation angle can be accurately set irrespective of whether the friction pad 6 is worn. Accordingly, the wear amount of the friction pad 6 can be accurately estimated. This enables the progression of wear of the friction pad 6 to be detected at all times, thereby preventing the wear of the friction pad 6 from progressing beyond its wear limit. By predicting, to a certain degree, the timing at which the friction pad 6 reaches its wear limit, a maintenance work for the electric brake device can be performed at an appropriate time before the timing at which the wear limit is reached.

Further, the motor rotation angle detector 28 which is required regardless of the presence/absence of a function for estimating the wear amount of the friction pad 6 is used to detect respective motor rotation angles at the retraction end and the advance end of the linear motion portion 14. This enables the wear of the friction pad 6 to be estimated without involving as great an increase in cost and space as the method (4) in which the pad wear amount is estimated from the relative positions of the slide pins and the caliper.

Figure 6:
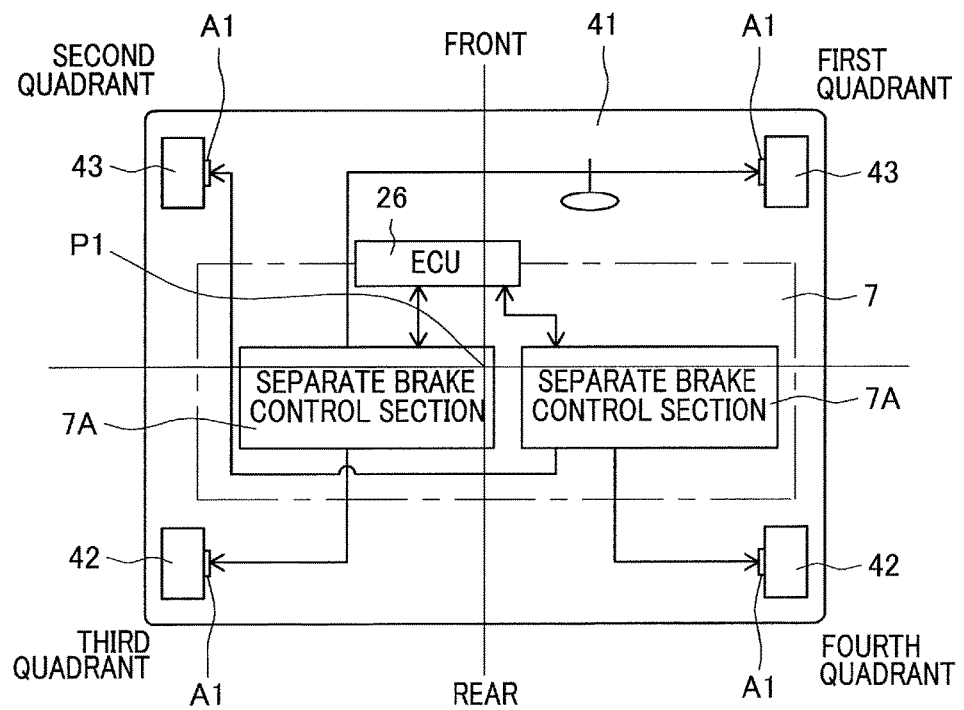
FIG. 6 is a diagram schematically illustrating a configuration of an electric brake device system in which a plurality of the electric brake devices are mounted to a vehicle.

FIG. 6 is a diagram schematically illustrating the configuration of an electric brake device system in which a vehicle includes a plurality (four in this example) of electric brake devices A1 described above. The vehicle is two-wheel driven vehicle using left and right rear wheels 42, 42 of a vehicle body 41 as drive wheels and left and right front wheels 43, 43 as driven wheels. The vehicle includes respective drive motors (not shown) that independently apply driving force to the left and right drive wheels. The vehicle has the electric brake devices A1 in respective four quadrants (first quadrant, second quadrant, third quadrant, and fourth quadrant) which are four regions separated around a gravity center P1 on a plane orthogonal to the gravity direction applied to the vehicle.

The controller 7 includes separate brake control sections 7A, 7A that separately control the respective electric motors 2 (FIG. 2). Each of the separate electric brake control sections 7A includes the inverter device 27. When none of the electric brake devices A1 are operated for a predetermined time or longer in estimation of a wear amount of any one of the friction pads, one of the separate brake control sections 7A enables the electric brake devices A1 in the predetermined quadrants (for example, the first quadrant and the third quadrant), of the four quadrants, that are diagonal to each other with respect to the gravity center P1, to perform normal brake operations. In addition, the other separate brake control section 7A causes the pad wear amount estimation section 37 (FIG. 2) to estimate wear amounts of the friction pads of the electric brake devices A1 in the other quadrants (for example, the second quadrant and the fourth quadrant).

In this case, when wear amounts of the friction pads are estimated during travelling of the vehicle and a normal brake operation is performed, the controller 7 operates the electric brake devices A1 in the quadrants that are diagonal to each other. This can suppress occurrence of undesired yaw moment to the vehicle, and can suppress that any behaviors work on the vehicle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

1 . . . housing
2 . . . electric motor
4 . . . linear motion mechanism
5 . . . brake rotor
6 . . . friction pad
7 . . . controller
9 . . . rotation shaft
10 . . . conversion mechanism section
11, 12 . . . restraining section
13 . . . load sensor
14 . . . linear motion portion
26a . . . braking force command section
28 . . . motor rotation angle detector
29 . . . brake operation portion
30 . . . braking force estimation section
37 . . . pad wear amount estimation section
38 . . . torque estimation section
39 . . . relation setting section

What is claimed is:
1. An electric brake device comprising:
an electric motor;
a brake rotor;
a friction pad configured to come into contact with the brake rotor to generate a braking force;
a linear motion mechanism configured to convert a rotary motion of the electric motor into a linear motion of the friction pad;
a housing configured to hold the electric motor and the linear motion mechanism;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force,
wherein the controller is provided with a pad wear amount estimation section configured to estimate a wear amount of the friction pad from the rotation angle of the electric motor, obtained by the motor rotation angle detector, which rotation angle corresponds to a distance between a retraction end at which a linear motion portion of the linear motion mechanism is separated from the brake rotor and an advance end at which the linear motion portion approaching the brake rotor generates the braking force,
the linear motion mechanism includes
a rotation shaft configured to be rotationally driven by the electric motor,
a conversion mechanism section configured to convert a rotary motion of the rotation shaft into a linear motion of the linear motion portion, and
a restraining section configured to generate a restraining force for restraining the axial position of the rotation shaft with respect to the housing, and the restraining section generates the restraining force for the rotation shaft with respect to the housing when the linear motion portion reaches the retraction end, and
the controller has a relation setting section configured to set a relation between an applied voltage to the electric motor and the rotation angle of the electric motor detected by the motor rotation angle detector, and
the controller estimates the restraining force by inquiring of the relation setting section about the applied voltage and the rotation angle.

2. The electric brake device as claimed in claim 1, wherein the braking force estimation section includes a load sensor configured to detect an axial load of the linear motion mechanism.

3. An electric brake device comprising:
an electric motor;
a brake rotor;
a friction pad configured to come into contact with the brake rotor to generate a braking force;
a linear motion mechanism configured to convert a rotary motion of the electric motor into a linear motion of the friction pad;
a housing configured to hold the electric motor and the linear motion mechanism;
a braking force command section configured to generate a command value of a target braking force by using an operation amount of a brake operation portion;
a braking force estimation section configured to obtain an estimated value of a braking force that presses the friction pad against the brake rotor;

a motor rotation angle detector configured to detect a rotation angle of the electric motor; and
a controller configured to control the electric motor according to the command value and the estimated value of the braking force,
wherein the controller is provided with a pad wear amount estimation section configured to estimate a wear amount of the friction pad from the rotation angle of the electric motor, obtained by the motor rotation angle detector, which rotation angle corresponds to a distance between a retraction end at which a linear motion portion of the linear motion mechanism is separated from the brake rotor and an advance end at which the linear motion portion approaching the brake rotor generates the braking force,
the linear motion mechanism includes
a rotation shaft configured to be rotationally driven by the electric motor,
a conversion mechanism section configured to convert a rotary motion of the rotation shaft into a linear motion of the linear motion portion, and
a restraining section configured to generate a restraining force for restraining the axial position of the rotation shaft with respect to the housing, and the restraining section generates the restraining force for the rotation shaft with respect to the housing when the linear motion portion reaches the retraction end, and
the controller has a torque estimation section configured to estimate a torque of the electric motor, and estimates the restraining force from the torque estimated by the torque estimation section.

4. An electric brake device system comprising:
a plurality of electric brake devices provided in a vehicle,
wherein each of the plurality of electric brake devices comprises
an electric motor;
a brake rotor;
a friction pad configured to come into contact with the brake rotor to generate a braking force;
a linear motion mechanism configured to convert a rotary motion of the electric motor into a linear motion of the friction pad;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force,
wherein the controller is provided with a pad wear amount estimation section configured to estimate a wear amount of the friction pad from the rotation angle of the electric motor, obtained by the motor rotation angle detector, which rotation angle corresponds to a distance between a retraction end at which a linear motion portion of the linear motion mechanism is separated from the brake rotor and an advance end at which the linear motion portion approaching the brake rotor generates the braking force,
wherein when the vehicle is stopped by a parking brake for a predetermined time or longer, the controller of one of the plurality of braking devices performs a normal brake operation, and the controller of another one of the plurality of braking devices causes the pad wear amount estimation section to estimate a wear amount of the friction pad in the another one of the plurality of electric brake devices.

5. The electric brake device system as claimed in claim 4, wherein each of the controllers of each of the plurality of electric brake devices is provided with a warning signal output section configured to output a warning signal to a higher-order control unit of the controller when the wear amount of the friction pad estimated by the pad wear amount estimation section is equal to or greater than a threshold.

6. An electric brake device system comprising:
a plurality of brake devices provided in a vehicle, at least one of the plurality electric brake devices being positioned in each of four quadrants of the vehicle,
wherein each of the plurality of electric brake devices comprises
an electric motor;
a brake rotor;
a friction pad configured to come into contact with the brake rotor to generate a braking force;
a linear motion mechanism configured to convert a rotary motion of the electric motor into a linear motion of the friction pad;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force,
wherein the controller is provided with a pad wear amount estimation section configured to estimate a wear amount of the friction pad from the rotation angle of the electric motor, obtained by the motor rotation angle detector, which rotation angle corresponds to a distance between a retraction end at which a linear motion portion of the linear motion mechanism is separated from the brake rotor and an advance end at which the linear motion portion approaching the brake rotor generates the braking force,
wherein when none of the plurality electric brake devices are operated for a predetermined time or longer,
the controllers of the electric brake devices in two of diagonal quadrants,. among the four quadrants of the vehicle, perform normal brake operations, and
controllers of the electric brake devices in remaining two quadrants, among the four quadrants of the vehicle, cause the pad wear amount estimation sections to estimate a wear amount of the friction pad in the electric brake devices of the electric brake devices in the remaining two quadrants.

* * * * *

UNITED STATES PATENT AND TRADEMARK OFFICE
CERTIFICATE OF CORRECTION

PATENT NO. : 10,125,834 B2
APPLICATION NO. : 15/265271
DATED : November 13, 2018
INVENTOR(S) : Yui Masuda Page 1 of 1

It is certified that error appears in the above-identified patent and that said Letters Patent is hereby corrected as shown below:

In the Claims

Column 16, Line 17:
In Claim 6, after "of" insert -- electric --.

Column 16, Line 57:
In Claim 6, delete "quadrants,." and insert -- quadrants, --, therefor.

Column 16, Line 59:
In Claim 6, after "in" insert -- a --.

Signed and Sealed this
Twelfth Day of February, 2019

Andrei Iancu
*Director of the United States Patent and Trademark Office*